(12) United States Patent
Ota

(10) Patent No.: US 10,001,957 B2
(45) Date of Patent: Jun. 19, 2018

(54) IMAGE FORMING APPARATUS HAVING A PLURALITY OF COMMUNICATION INTERFACES, AND METHOD FOR MANAGING IMAGE FORMING OF IMAGE DATA FROM DIFFERENT COMMUNICATION INTERFACES, AND COMPUTER-READABLE MEDIUM THEREFOR

(71) Applicant: BROTHER KOGYO KABUSHIKI KAISHA, Nagoya, Aichi (JP)

(72) Inventor: Mineyuki Ota, Kasugai (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days. days.

(21) Appl. No.: 15/470,985

(22) Filed: Mar. 28, 2017

(65) Prior Publication Data
US 2017/0286025 A1 Oct. 5, 2017

(30) Foreign Application Priority Data
Mar. 31, 2016 (JP) ................. 2016-072183

(51) Int. Cl.
G06F 3/12 (2006.01)
H04N 1/21 (2006.01)
H04N 1/23 (2006.01)

(52) U.S. Cl.
CPC .......... *G06F 3/1236* (2013.01); *G06F 3/1203* (2013.01); *G06F 3/1212* (2013.01); *G06F 3/1237* (2013.01); *G06F 3/1286* (2013.01); *H04N 1/21* (2013.01); *H04N 1/23* (2013.01); *H04N 2201/0094* (2013.01)

(58) Field of Classification Search
CPC .................................... G06F 3/1236
USPC ......................................................... 358/1.15
See application file for complete search history.

(56) References Cited

U.S. PATENT DOCUMENTS

2005/0099962 A1* 5/2005 Matsuda ............. H04L 41/0253
370/254
2011/0060833 A1* 3/2011 Nogawa ................ H04W 8/245
709/225
2013/0259025 A1* 10/2013 Terashita ................ H04L 69/18
370/351

FOREIGN PATENT DOCUMENTS

JP 2007018427 A 1/2007
JP 2015091661 A 5/2015

* cited by examiner

*Primary Examiner* — Jacky X Zheng
(74) *Attorney, Agent, or Firm* — Scully, Scott, Murphy & Presser, P.C.

(57) ABSTRACT

An image forming apparatus includes a controller configured to perform a first storing process including storing into a storage first image data received from a first external device via a first communication interface, when a value representing a condition of a wireless connection between the first external device and the first communication interface is less than a threshold, perform a first image forming process including after completion of the first storing process, controlling the image former to perform image formation for the stored first image data, and when the value is less than the threshold, in response to receiving second image data from a second external device via a second communication interface during the first storing process, perform a second image forming process in advance of the first image forming process, the second image forming process including controlling the image former to perform image formation for the second image data.

16 Claims, 8 Drawing Sheets

… (1) …

IMAGE FORMING APPARATUS HAVING A PLURALITY OF COMMUNICATION INTERFACES, AND METHOD FOR MANAGING IMAGE FORMING OF IMAGE DATA FROM DIFFERENT COMMUNICATION INTERFACES, AND COMPUTER-READABLE MEDIUM THEREFOR

CROSS-REFERENCE TO RELATED APPLICATION

This application claims priority under 35 U.S.C. § 119 from Japanese Patent Application No. 2016-072183 filed on Mar. 31, 2016. The entire subject matter of the application is incorporated herein by reference.

BACKGROUND

Technical Field

The following description relates to one or more aspects of an image forming apparatus.

Related Art

In data transmission of image data from an external terminal to an image forming apparatus via wireless communication, when a condition (e.g., a radio wave condition) of the wireless connection therebetween is deteriorated, it might be impossible to maintain satisfactory communication therebetween and properly transmit the image data from the external terminal to the image forming apparatus. It is noted that, hereinafter, what is referred to as "a condition of a wireless connection" may represent a radio wave condition of the wireless connection. Thus, when satisfactory communication is maintained between the image forming apparatus and the external terminal under an appropriate condition of the wireless connection therebetween, the image forming apparatus performs image formation for the image data while receiving the image data from the external terminal. Meanwhile, when the communication between the image forming apparatus and the external terminal is liable to be broken off under an inappropriate condition of the wireless connection therebetween, the image forming apparatus performs image formation for the image data after completing receipt of the image data from the external terminal.

SUMMARY

Aspects of the present disclosure are advantageous to provide one or more improved techniques, for an image forming apparatus, which make it possible to, under an inappropriate condition of a wireless connection between a first communication interface of the apparatus and a first external device, prevent delay in execution of image formation for image data received from a second external device via a second communication interface of the apparatus.

According to aspects of the present disclosure, an image forming apparatus is provided. The image forming apparatus includes a first communication interface configured to perform wireless communication with a first external device, a second communication interface configured to communicate with a second external device, an image former configured to form an image on a sheet, a storage, and a controller. The controller is configured to perform a first storing process including receiving a first image forming instruction and first image data from the first external device via the first communication interface, and storing the received first image data into the storage. The controller is further configured to, when a particular value representing a radio wave condition of a wireless connection between the first external device and the first communication interface is less than a predetermined threshold, perform a first image forming process including after completion of the first storing process, controlling the image former to perform image formation for the first image data stored in the storage by the first storing process. The controller is further configured to, when the particular value is less than the predetermined threshold, in response to receipt of a second image forming instruction and second image data from the second external device via the second communication interface during execution of the first storing process, perform a second image forming process in advance of the first image forming process, the second image forming process including controlling the image former to perform image formation for the second image data received via the second communication interface.

According to aspects of the present disclosure, further provided is a method implementable on a processor coupled with a first communication interface, a second communication interface, an image former, and a storage. The method including performing a first storing process including receiving a first image forming instruction and first image data from a first external device via wireless communication by the first communication interface, and storing the received first image data into the storage, when a particular value representing a radio wave condition of a wireless connection between the first external device and the first communication interface is less than a predetermined threshold, performing a first image forming process including after completion of the first storing process, controlling the image former to perform image formation for the first image data stored in the storage by the first storing process, and when the particular value is less than the predetermined threshold, in response to receipt of a second image forming instruction and second image data from a second external device via the second communication interface during execution of the first storing process, performing a second image forming process in advance of the first image forming process, the second image forming prowess including controlling the image former to perform image formation for the second image data received via the second communication interface.

According to aspects of the present disclosure, further provided is a non-transitory computer-readable medium storing computer-readable instructions that are executable by a processor coupled with a first communication interface, a second communication interface, an image former, and a storage. The instructions are configured to, when executed by the processor, cause the processor to perform a first storing process including receiving a first image forming instruction and first image data from a first external device via wireless communication by the first communication interface, and storing the received first image data into the storage. The instructions are further configured to, when executed by the processor, cause the processor to, when a particular value representing a radio wave condition of a wireless connection between the first external device and the first communication interface is less than a predetermined threshold, perform a first image forming process including after completion of the first storing process, controlling the image former to perform image formation for the first image data stored in the storage by the first storing process. The instructions are further configured to, when executed by the processor, cause the processor to, when the particular value is less than the predetermined threshold, in response to receipt of a second image forming instruction and second image data from a second external device via the second communication interface during execution of the first storing process, perform a second image forming process in advance of the first image forming process, the second image forming process including controlling the image former to perform image formation for the second image data received via the second communication interface.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

<Electrical Configuration of MFP>

Figure 1:
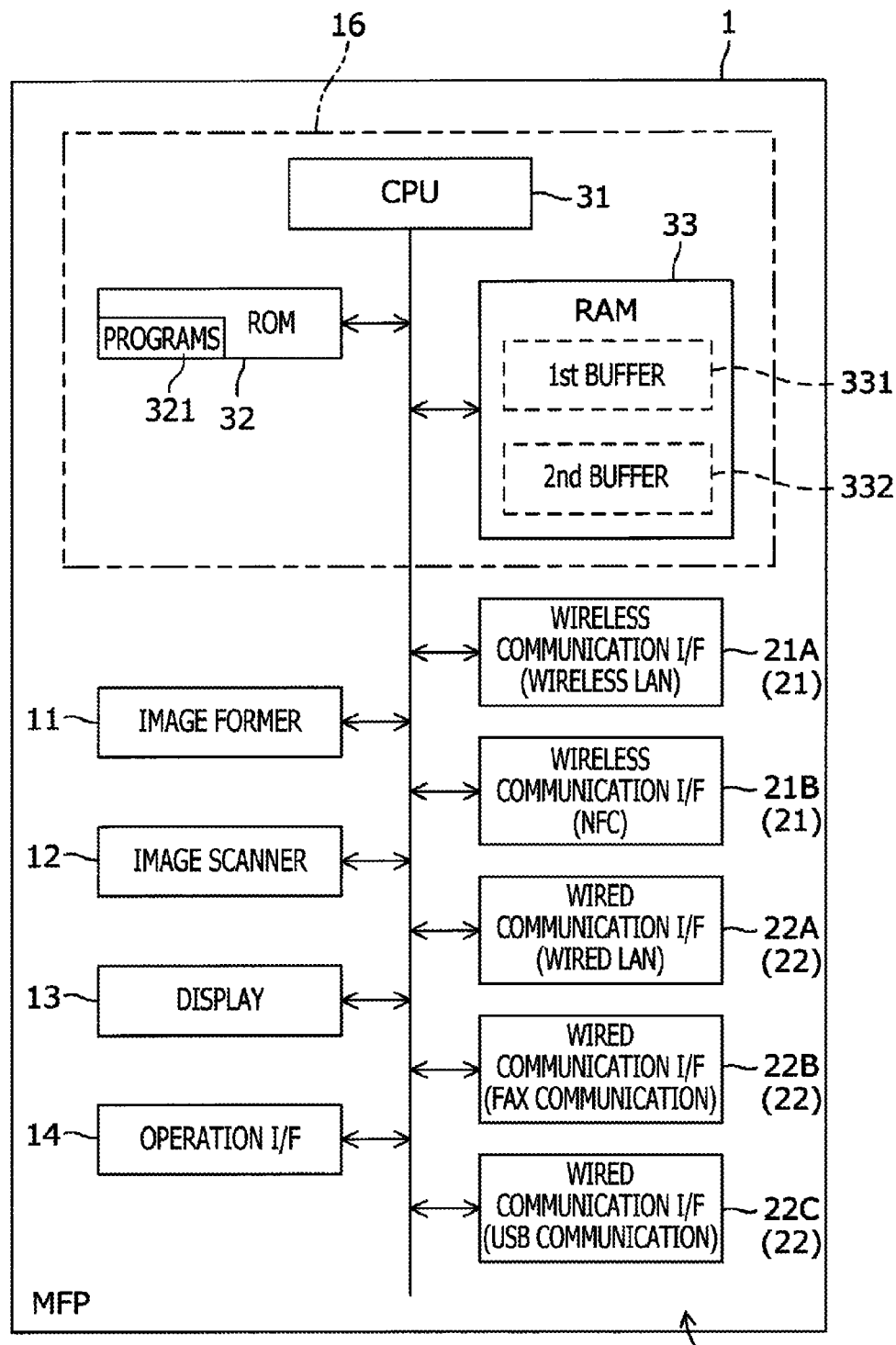
FIG. 1 is a block diagram schematically showing an electrical configuration of a multi-function peripheral (hereinafter, which may be referred to as an "MFP") in an illustrative embodiment according to one or more aspects of the present disclosure.

A multi-function peripheral (hereinafter referred to as an "MFP") 1 as an example of an image forming apparatus has a printing function and a scanning function. As shown in FIG. 1, the MFP 1 includes an image former 11, an image scanner 12, a display 13, an operation I/F ("I/F" is an abbreviated form of interface) 14, communication I/Fs 15 (e.g., wireless communication I/Fs 21, and wired communication I/Fs 22), and a controller 16.

The image former 11 is configured to form on a sheet an image (a color image or a monochrome image) based on image data in an image forming method (e.g., an electrographic method or an inkjet method).

The image scanner 12 includes an image sensor and an analog front end (hereinafter, which may be referred to as an "AFE"). The image scanner 12 is configured to scan an image of a document by the image scanner and convert an analog image signal output from the image sensor into digital image data via the AFE.

The display 13 includes a liquid crystal display device. The display 13 is configured to display various kinds of information.

The operation I/F 14 includes operable buttons (e.g., a start key, a numeric keypad, and a cursor key). A user is allowed to input various kinds of instructions via the operation I/F 14 by operating the operable buttons.

Figure 10A:
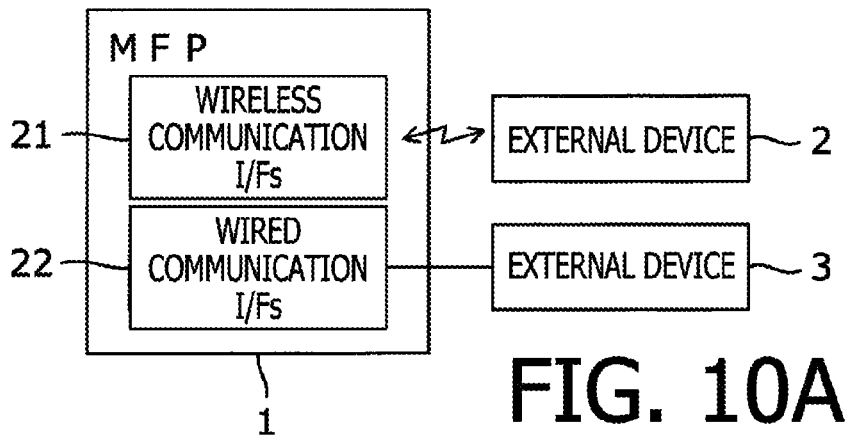
FIGS. 10A to 10C show relationships among the MFP and external devices in the illustrative embodiment according to one or more aspects of the present disclosure.

The communication I/Fs 15 include the wireless communication I/Fs 21 and the wired communication I/Fs 22. The wireless communication I/Fs 21 are configured to perform wireless communication with an external device 2 (see e.g., FIG. 10A). The wired communication I/Fs 22 are configured to perform wired communication with an external device 3 (see e.g., FIG. 10A). Thereby, as shown in FIG. 10A, the MFP 1 is allowed to perform wireless communication with the external device 2 via the wireless communication I/Fs 21 and perform wired communication with the external device 3 via the wired communication/Fs 22.

Figure 10B:
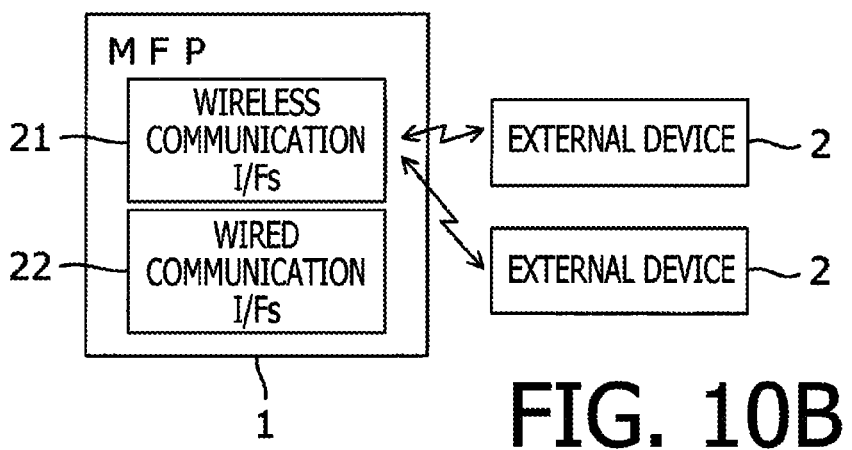

The external device 2 may include, but is not limited to, a personal computer (hereinafter referred to as a "PC") and a mobile terminal that are configured to perform near-field wireless communication (hereinafter referred to as "NFC"). Exemplary methods for the NFC may include, but are not limited to, a wireless LAN and Bluetooth (trademark registered). The wireless communication I/Fs 21 include a wireless communication I/F 21A and a wireless communication I/F 21B. For instance, the wireless communication I/F 21A includes a circuit for wireless LAN communication. The wireless communication I/F 21B includes a circuit for NFC. Thereby, as shown in FIG. 10B, the MFP 1 is allowed to perform wireless communication with a plurality of external devices 2.

Figure 10C:
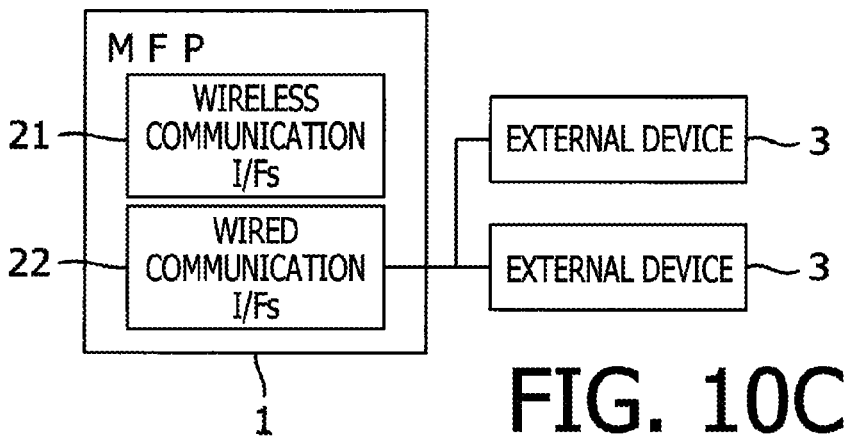

The external device 3 may include, but is not limited to, a PC connected with a wired LAN, and a facsimile machine connected with a facsimile line. The wired communication I/Fs 22 include a wired communication I/F 22A, a wired communication I/F 22B, and a wired communication I/F 22C. The wired communication I/F 22A includes a circuit for wired LAN communication. The wired communication I/F 22B includes a modem for facsimile communication. The wired communication I/F 22C includes a USB port. The wired communication I/F 22C is configured to perform wired communication with the external device 3 (e.g., a mobile terminal) connected with the USB port. The wired communication I/Fs 22 communicate with the external device 3 via a wired communication line. Therefore, the wired communication I/Fs 22 is enabled to perform more stable high-speed communication than the wireless communication I/Fs 21. Thus, as shown in FIG. 10C, the MFP 1 is allowed to perform wired communication with a plurality of external devices 3.

The controller 16 includes a CPU 31, a ROM 32, and a RAM 33.

The CPU 31 is configured to receive data and signals input thereinto, which include, for instance, image data acquired by the image scanner 12 and an operation signal representing what kind of operation has been performed to the operation I/F 14. The CPU 31 is further configured to, based on the input data and signals, execute programs 321 stored in the ROM 32, thereby controlling the image former 11, the image scanner 12, the display 13, and the communication I/Fs 15. For instance, the communication I/Fs 15 are controlled by the CPU 31 to communicate with the external devices 2 and 3. When the CPU 31 is executing the programs 321 to control the elements included in the MFP 1, the RAM 33 is used as a work area. The RAM 33 may include a non-volatile memory such as an NVRAM.

<Main Flowchart>

Figure 2:
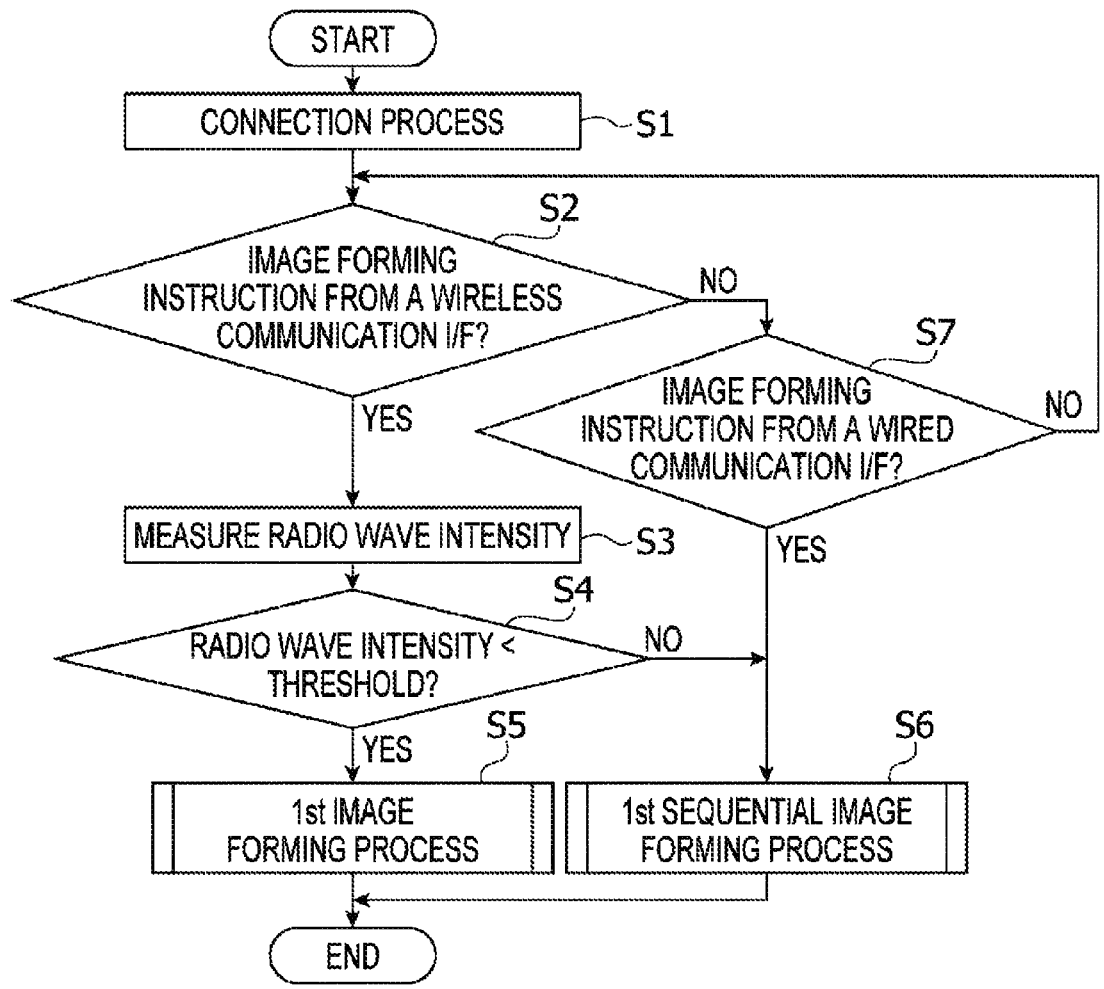
FIG. 2 is a main flowchart for image formation in the illustrative embodiment according to one or more aspects of the present disclosure.

When executing one or more programs 321 stored in the ROM 32, the CPU 31 performs a process according to a main flowchart shown in FIG. 2. Thereby, the MFP 1 performs image formation in accordance with one or more image forming instructions received from one or more external devices 2 and 3 via the communication I/Fs 15.

In response to receiving a communication request from an external device 2 via one of the wireless communication I/Fs 21, the CPU 31 performs a connection process to establish communication between the external device 2 and the wireless communication I/F 21 (S1). Further, in response to receiving a communication request from an external device 3 via one of the wired communication I/Fs 22, the CPU 31 performs a connection process to establish communication between the external device 3 and the wired communication I/F 22 (S1).

In response to the communication between the external device 2 and the wireless communication I/F 21 being established, the external device 2 wirelessly transmits an image forming instruction and image data to the wireless communication I/F 21. The image forming instruction includes information such as a data size of the image data and a sheet size of a sheet on which an image is to be formed based on the image data. When having received the image forming instruction from the wireless communication I/F 21 (S2: Yes), the CPU 31 measures, via the wireless communication I/F 21, an intensity of radio waves used for the wireless communication between the external device 2 and the wireless communication I/F 21 (S3).

When the measured intensity of the radio waves is less than a predetermined threshold (S4: Yes), the CPU 31 performs a first image forming process (S5). The first image forming process will be described later.

Figure 6:
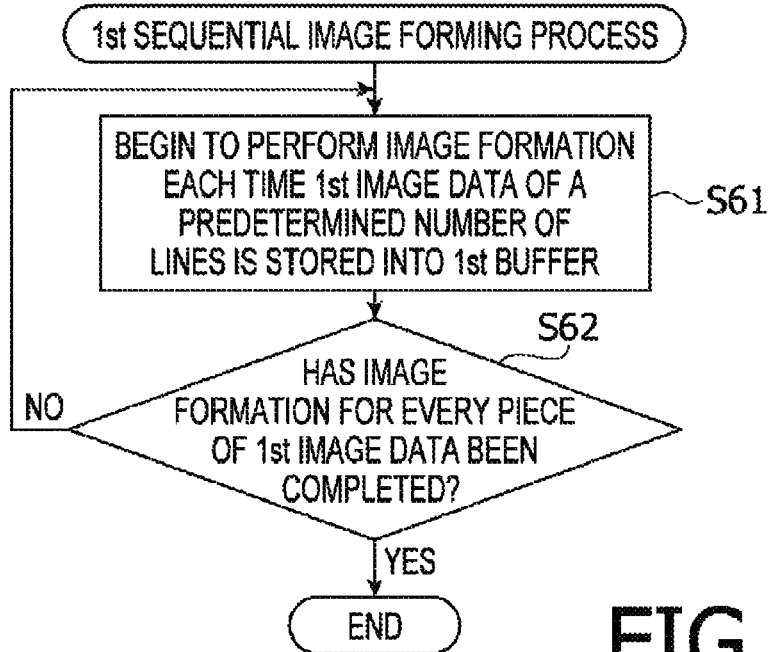
FIG. 6 is a flowchart showing a procedure of a first sequential image forming process in the illustrative embodiment according to one or more aspects of the present disclosure.

Meanwhile, when the measured intensity of the radio waves is equal to or more than the predetermined threshold (S4: No), the CPU 31 performs a first sequential image forming process (S6). FIG. 6 shows the first sequential image forming process to be executed by the CPU 31. Each time image data (hereinafter referred to as "first image data") of a predetermined number of lines is stored into a first buffer 331 (see FIG. 1) provided in the RAM 33, the CPU 31 controls the image former 11 to start forming an image represented by the stored first image data (S61). The CPU 31 repeatedly executes S61 until the CPU 31 completes image formation for every piece of the first image data received from the external device 2 via the wireless communication I/F 21. When having completed image formation for every piece of the first image data (S62: Yes), the CPU 31 terminates the first sequential image forming process.

In response to the communication between the external device 3 and the wired communication I/F 22 being established, The external device 3 transmits an image forming instruction and image data to the wired communication I/F 22 via the wired communication. When having received the image forming instruction from the wired communication I/F 22 (S7: Yes), the CPU 31 performs the first sequential image forming process (S6).

<First Image Forming Process>

Figure 3:
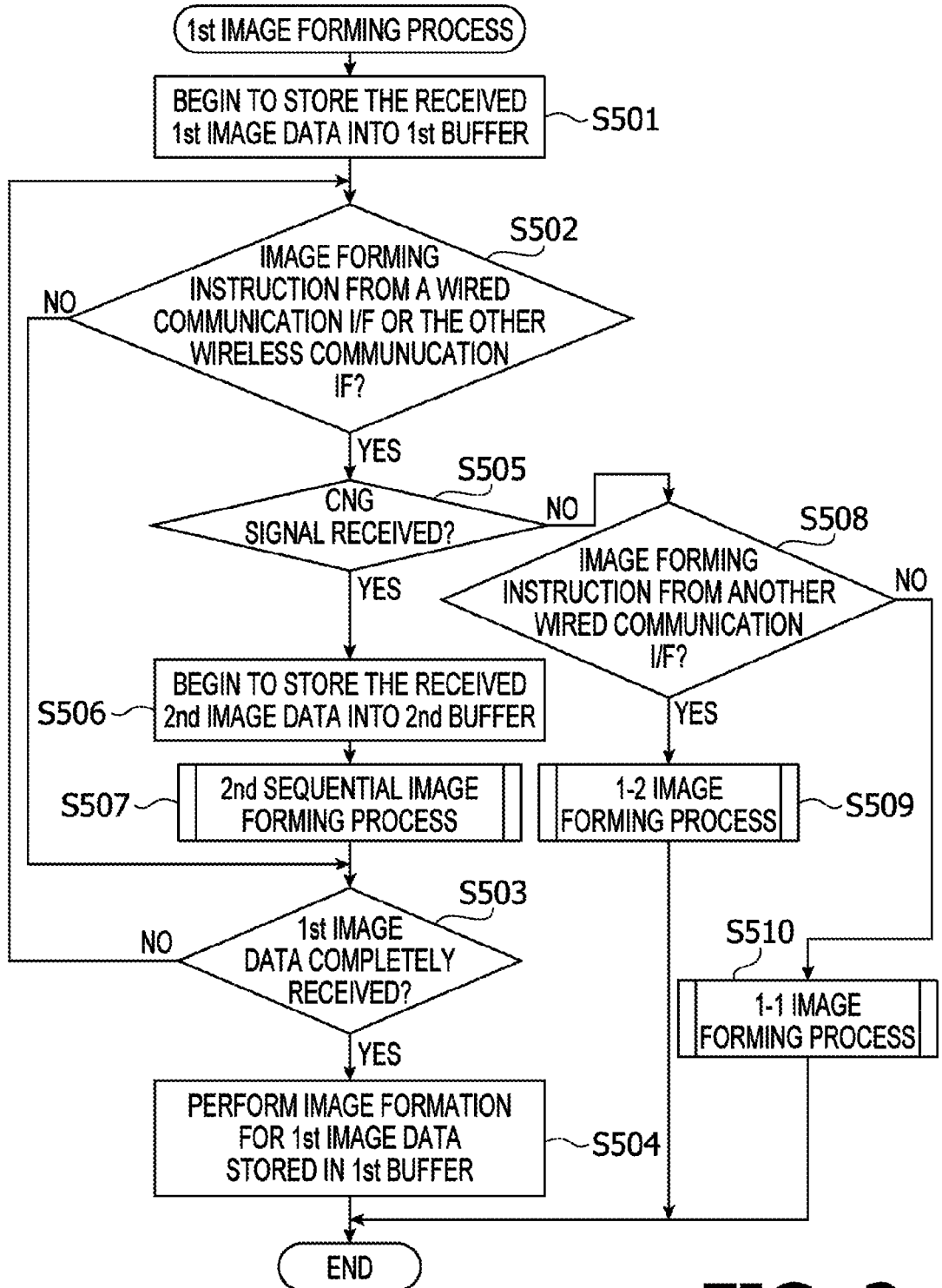
FIG. 3 is a flowchart showing a procedure of a first image forming process in the illustrative embodiment according to one or more aspects of the present disclosure.

When the CPU 31 has received the image forming instruction from the wireless communication I/F 21 (S2: Yes), and the intensity of the radio waves used for the wireless communication between the external device 2 and the wireless communication I/F 21 is less than the threshold (S4: Yes), the CPU 31 performs the first image forming process in S5 (see FIG. 2). FIG. 3 shows a procedure of the first image forming process.

In the first image forming process, the CPU 31 begins to store the first image data received from the external device 2 via the wireless communication I/F 21 into the first buffer 331 of the RAM 33 (S501).

After beginning to store the first image data into the first buffer 331 (S501), the CPU 31 determines whether the CPU 31 has received a new image forming instruction via the other wireless communication I/F 21, different from the wireless communication I/F 21 that is receiving the first image data, or one of the wired communication I/Fs 22 (S502).

The CPU 31 repeatedly makes the determination in S502 as to whether the CPU 31 has received a new image forming instruction until the CPU 31 receives a new image forming instruction (S502: Yes), or until the CPU 31 completes receipt of the first image data being currently received (S503: Yes).

When having completed receipt of the first image data via the wireless communication I/F 21 without receiving a new image forming instruction (S503: Yes), the CPU 31 controls the image former 11 to perform image formation for the first image data stored in the first buffer 331 (S504). Afterwards, the CPU 31 terminates the first image forming process.

When having received a new image forming instruction before completing receipt of the first image data being currently received (S502: Yes), the CPU 31 determines whether the wired communication I/F 22B has received a CNG signal (S505). The CNG signal is a FAX identification signal.

When determining that the wired communication I/F 22B has received a CNG signal (S505: Yes), the CPU 31 begins to store image data (hereinafter referred to as "second image data") newly received from an external device 3 via the wired communication I/F 22B, into a second buffer 332 (see FIG. 1) provided to the RAM 33 (S506).

Figure 7:
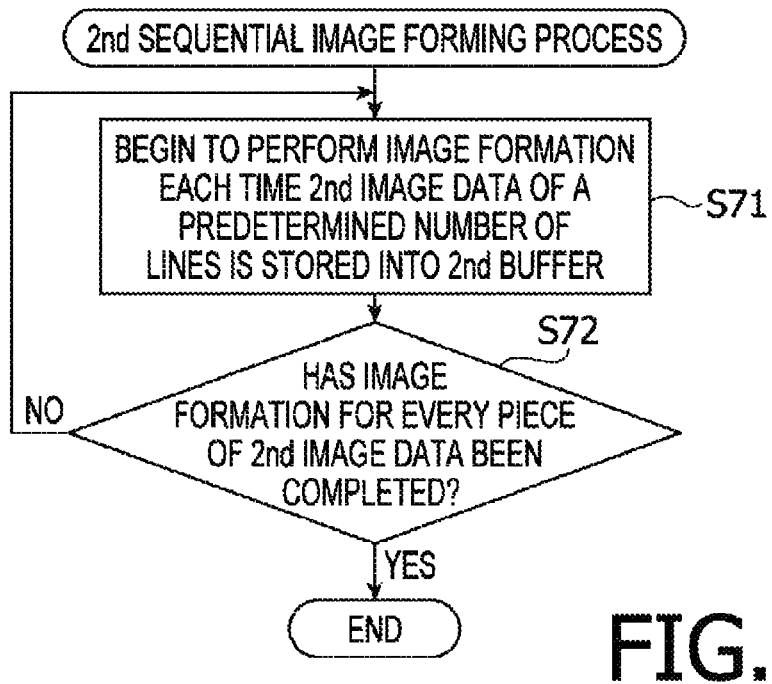
FIG. 7 is a flowchart showing a procedure of a second sequential image forming process in the illustrative embodiment according to one or more aspects of the present disclosure.

After beginning to store the second image data (S506), the CPU 31 performs a second sequential image forming process (S507). FIG. 7 shows the second sequential image forming process to be executed by the CPU 31. Each time the second image data of a predetermined number of lines is stored into the second buffer 332, the CPU 31 controls the image former 11 to form an image represented by the stored second image data (S71). The CPU 31 repeatedly performs S71 until the CPU 31 completes image formation for every piece of the second image data received from the external device 3 via the wired communication I/F 22B. When having completed image formation for every piece of the second image data (S72: Yes), the CPU 31 terminates the second sequential image forming process.

After terminating the second sequential image forming process in S507 (see FIG. 3), when determining that the CPU 31 has not completed receipt of the first image data being currently received (S503: No), the CPU 31 again determines whether the CPU 31 has received a new image forming instruction (S502). Meanwhile, when determining that the CPU 31 has completed receipt of the first image data being currently received (S503: Yes), the CPU 31 controls the image former 11 to perform image formation for the first image data stored in the first buffer 331 (S504). Afterwards, the CPU 31 terminates the first image forming process.

When having received a new image forming instruction via one of the wired communication I/Fs 22A and 22C before completion of receiving the first image data being currently received (S508: Yes), the CPU 31 performs a 1-2 image forming process (S509). The 1-2 image forming process will be described later.

After completion of the 1-2 image forming process (S509), the CPU 31 terminates the first image forming process.

Further, when having received a new image forming instruction via the other wireless communication I/F 21 before completion of receiving the first image data being currently received (S508: No), the CPU 31 performs a 1-1 image forming process (S510). It is noted that "the other wireless communication I/F 21" is the wireless communication I/F 21B when the wireless communication I/F 21A is currently receiving the first image data, and is the wireless communication I/F 21A when the wireless communication I/F 21B is currently receiving the first image data. Afterwards, the CPU 31 terminates the first image forming process. The 1-1 image forming process will be described below.

<1-1 Image Forming Process>

Figure 4:
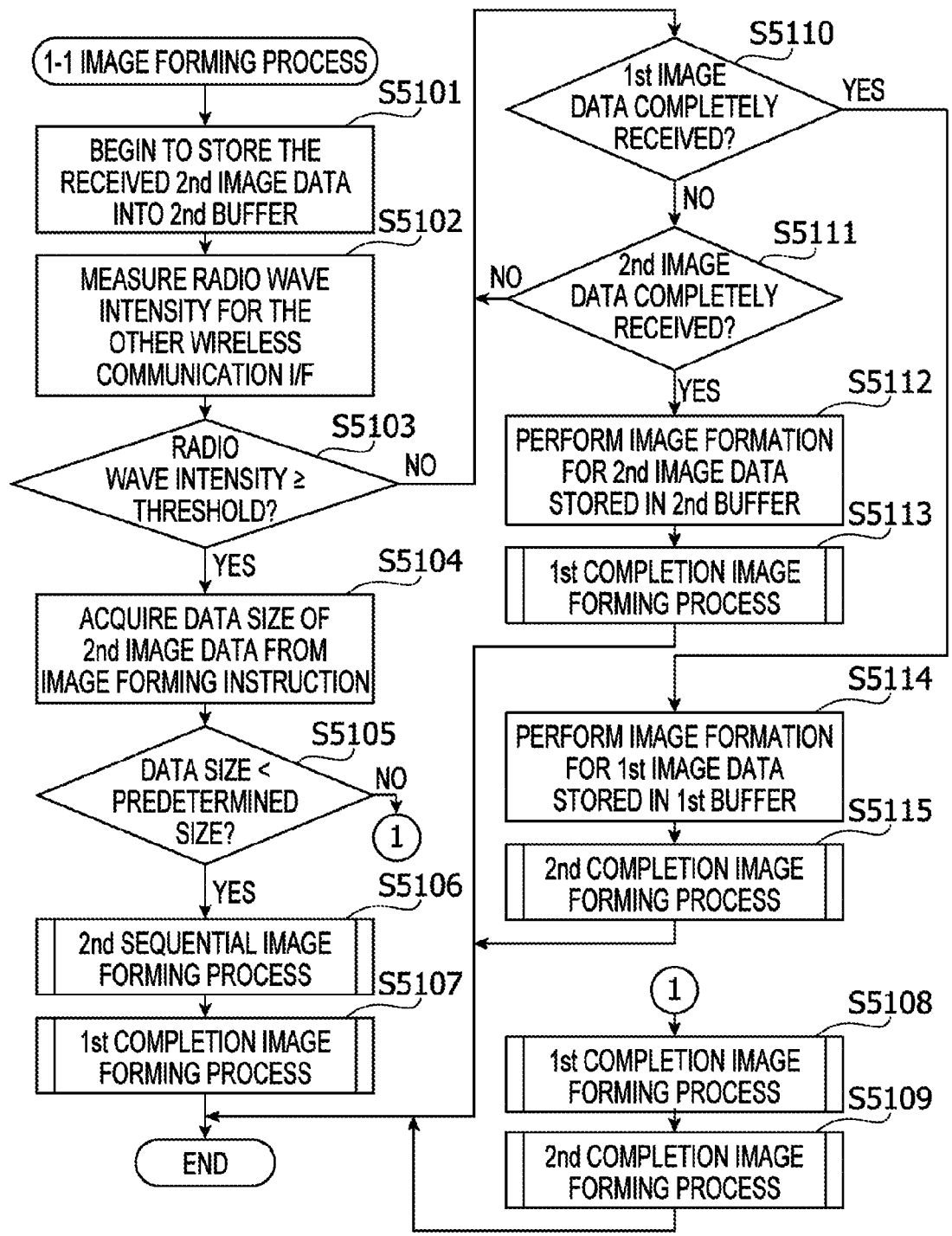
FIG. 4 is a flowchart showing a procedure of a 1-1 image forming process in the illustrative embodiment according to one or more aspects of the present disclosure.

As shown in FIG. 4, in the 1-1 image forming process, the CPU 31 begins to store, into the second buffer 332 of the RAM 33, the second image data received from another external device 2 via the other wireless communication I/F 21 (S5101).

After beginning to store the second image data, the CPU 31 measures an intensity of radio waves used for the wireless communication between the external device 2 and the other wireless communication I/F 21 (S5102).

When the measured intensity of the radio waves is equal to or more than a predetermined threshold (S5103: Yes), the CPU 31 refers to the image forming instruction received via the other wireless communication I/F 21, and acquires a data size of the second image data from the image forming instruction (S5104).

Thereafter, the CPU 31 determines whether the acquired data size is less than a predetermined size (S5105).

When determining that the acquired data size is less than the predetermined size (S5105: Yes), the CPU 31 performs the aforementioned second sequential image forming process (S5106). Namely, in the second sequential image forming process, as shown in FIG. 7, each time the second image data of the predetermined number of lines is stored into the second buffer 332, the CPU 31 controls the image former 11 to start forming an image represented by the stored second image data (S71). The CPU 31 repeatedly executes S71 until the CPU 31 completes image formation for every piece of the second image data received from the external device 3 via the wired communication I/F 22B. When having completed image formation for every piece of the second image data (S72: Yes), the CPU 31 terminates the second sequential image forming process.

Figure 8:
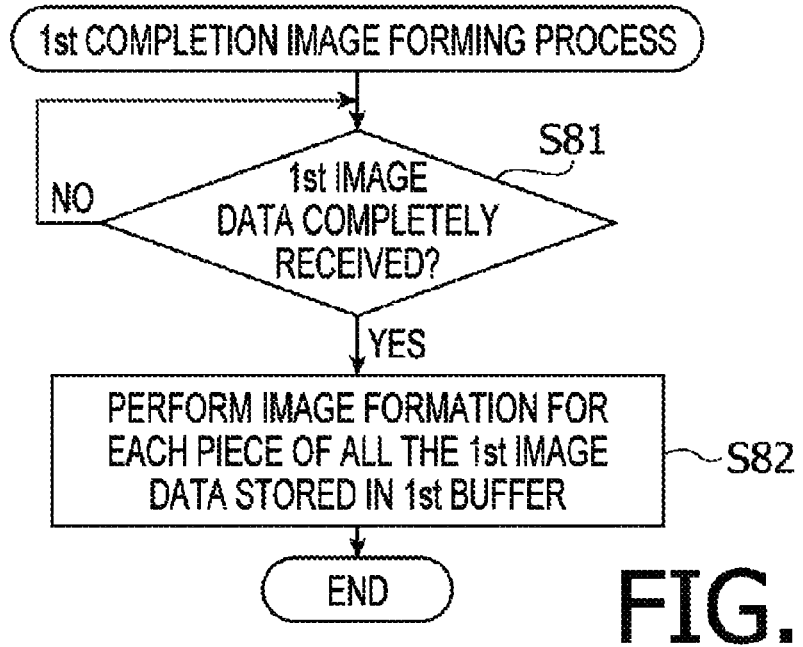
FIG. 8 is a flowchart showing a procedure of a first completion image forming process in the illustrative embodiment according to one or more aspects of the present disclosure.

After terminating the second sequential image forming process, the CPU 31 performs a first completion image forming process (S5107). In the first completion image forming process, as shown in FIG. 8, when having completed receipt of the first image data (S81: Yes), the CPU 31 controls the image former 11 to perform image formation for each piece of all the first image data stored in the first buffer 331 (S82). Afterwards, the CPU 31 terminates the first completion image forming process. By the execution of the first completion image forming process, an image represented by each piece of all the first image data stored in the first buffer 331 is formed. Along with the first completion image forming process being terminated, the 1-1 image forming process is terminated.

Meanwhile, when determining that the acquired data size of the second image data is equal to or more than the predetermined size (S5105: No), the CPU 31 first performs the first completion image forming process (S5108), and next performs the second sequential image forming process (S5109). Thereafter, the CPU 31 terminates the 1-1 image forming process.

When the measured intensity of the radio waves used for the wireless communication between the external device 2 and the other wireless communication I/F 21 is less than the predetermined threshold (S5103: No), the CPU 31 determines whether the CPU 31 has completed receipt of the first image data (S5110).

When determining that the CPU 31 has not completed receipt of the first image data (S5110: No), the CPU 31 determines whether the CPU 31 has completed receipt of the second image data (S5111).

When determining that the CPU 31 has not completed receipt of the second image data (S5111: No), the CPU 31 again determines whether the CPU 31 has completed receipt of the first image data (S5110). Thereby, the determination as to whether the CPU 31 has completed receipt of the first image data and the determination as to whether the CPU 31 has completed receipt of the second image data are repeatedly made.

When having completed receipt of the second image data before completing receipt of the first image data (S5111: Yes), the CPU 31 controls the image former 11 to form an image represented by the second image data stored in the second buffer 332 (S5112).

When having completed image formation for each piece of all the second image data stored in the second buffer 332, the CPU 31 performs the first completion image forming process (S55113). Thereafter, the CPU 31 terminates the 1-1 image forming process. By the execution of the first completion image forming process, an image represented by each piece of all the first image data stored in the first buffer 331 is formed.

When having completed receipt of the first image data before completing receipt of the second image data (S5110: Yes), the CPU 31 controls the image former 11 to form an image represented by the first image data stored in the first buffer 331 (S5114).

Figure 9:
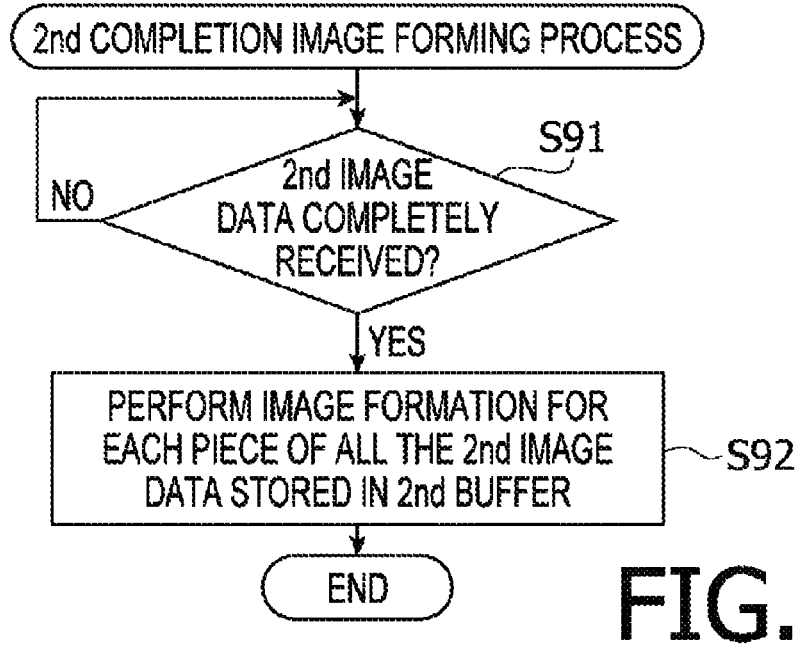
FIG. 9 is a flowchart showing a procedure of a second completion image forming process in the illustrative embodiment according to one or more aspects of the present disclosure.

When an image represented by each piece of all the first image data stored in the first buffer 331 has been formed, the CPU 31 performs a second completion image forming process (S5115). Thereafter, the CPU 31 terminates the 1-1 image forming process. In the second completion image forming process, as shown in FIG. 9, when having completed receipt of the second image data (S91: Yes), the CPU 31 controls the image former 11 to perform image formation for the second image data stored in the second buffer 332 (S92). Afterwards, the CPU 31 terminates the second completion image forming process. By the execution of the second completion image forming process, an image represented by each piece of all the second image data stored in the second buffer 332 is formed.

<1-2 Image Forming Process>

Figure 5:
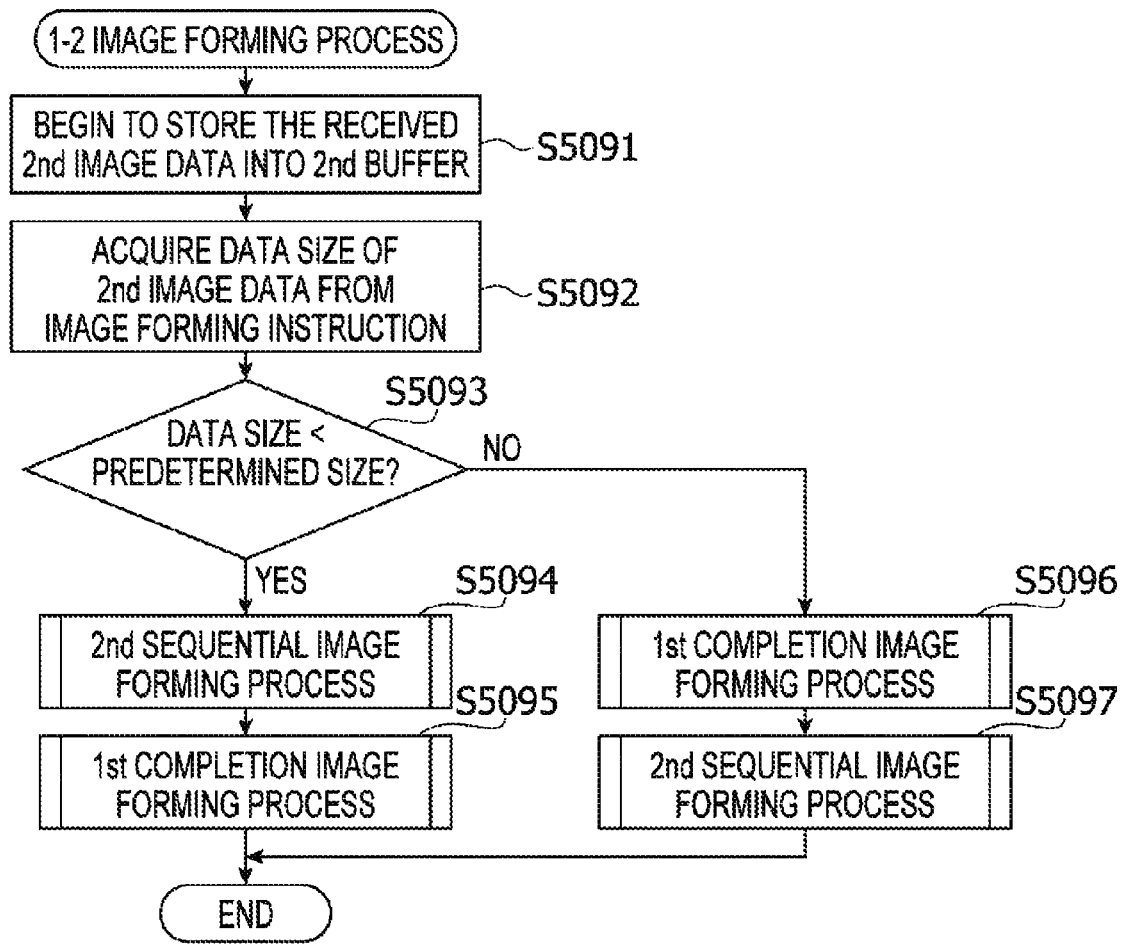
FIG. 5 is a flowchart showing a procedure of a 1-2 image forming process in the illustrative embodiment according to one or more aspects of the present disclosure.

FIG. 5 shows a procedure of the 1-2 image forming process to be executed in S509 shown in FIG. 3.

In the 1-2 image forming process, the CPU 31 begins to store the second image data newly received from an external device 3 via one of the wired communication I/Fs 22A and 22C, into the second buffer 332 of the RAM 33 (S5091).

After beginning to store the second image data (S5091), the CPU 31 refers to the image forming instruction received via the one of the wired communication/Fs 22A and 22C, and acquires a data size of the second image data from the image forming instruction (S5092).

Afterwards, the CPU 31 determines whether the acquired data size is less than a predetermined size (S5093).

When determining that the data size of the second image data is less than the predetermined size (S5093: Yes), the CPU 31 performs the aforementioned second sequential image forming process (S5106). Namely, in the second sequential image forming process, as shown in FIG. 7, each time the second image data of the predetermined number of lines is stored into the second buffer 332, the CPU 31 controls the image former 11 to start forming an image represented by the stored second image data (S71). The CPU 31 repeatedly executes S71 until the CPU 31 completes image formation for every piece of the second image data received from the external device 3 via the wired communication I/F 22B. When having completed image formation for every piece of the second image data (S72: Yes), the CPU 31 terminates the second sequential image forming process.

After terminating the second sequential image forming process, the CPU 31 performs the aforementioned first completion image forming process (S5095). Namely, in the first completion image forming process, as shown in FIG. 8, when having completed receipt of the first image data (S81: Yes), the CPU 31 controls the image former 11 to perform image formation for each piece of all the first image data stored in the first buffer 331 (S82). Afterwards, the CPU 31 terminates the first completion image forming process. By the execution of the first completion image forming process, an image represented by each piece of all the first image data stored in the first buffer 331 is formed. Along with the first completion image forming process being terminated, the 1-2 image forming process is terminated.

Meanwhile, when determining that the data size of the second image data is equal to or more than the predetermined size (S5093: No), the CPU 31 first performs the first completion image forming process (S5096), and next performs the second sequential image forming process (S5097). Thereafter, the CPU 31 terminates the 1-2 image forming process.

<Operations and Advantageous Effects>

As described above, a first image forming instruction and first image data received from an external device 2 via a wireless communication I/F 21 are stored into the first buffer 331 provided in the RAM 33. When an intensity of radio waves that represents a condition of a wireless connection between the external device 2 and the wireless communication I/F 21 is less than a predetermined threshold (i.e., when the condition of the wireless connection is inappropriate), after completion of storing the first image data received from the external device 2 into the first buffer 331, the CPU 31 of the MFP 1 performs image formation for the first image data stored in the first buffer 331. It is noted that, hereinafter, what is referred to as "a condition of a wireless connection" may represent a radio wave condition of the wireless connection.

When the condition of the wireless connection between the external device 2 and the wireless communication I/F 21 is inappropriate, it takes a relatively long time to receive the first image data from the external device 2. In this case, when receiving a second image forming instruction from an external device 2 or 3 via the other wireless communication I/F 21 or a wired communication I/F 22 while receiving the first image data from the external device 2 via the wireless communication I/F 21 (i.e., while storing the first image data into the first buffer 331), the CPU 31 performs image formation for second image data received via the other wireless communication I/F 21 or the wired communication I/F 22 in advance of performing image formation for the first image data received via the wireless communication I/F 21.

Therefore, when the condition of the wireless connection between the external device 2 and the wireless communication I/F 21 is inappropriate, it is possible to prevent delay in performing image formation for the second image data received from the external device 2 or 3.

When the intensity of the radio waves that represents the condition of the wireless connection between the external device 2 and the wireless communication I/F 21 is equal to or more than the predetermined threshold (i.e., when the condition of the wireless connection is appropriate), the CPU 31 performs the first sequential image forming process. In the first sequential image forming process, each time the first image data of a predetermined number of lines is stored into the first buffer 331, the CPU 31 performs image formation for the stored first image data of the predetermined number of lines. Thereby, it is possible to make shorter a period of time between when the CPU 31 begins to receive the first image data and when the CPU 31 completes image formation for every piece of the first image data, than when the CPU 31 begins to perform image formation for the first image data after completion of storing all the first image data into the first buffer 331.

When receiving second image data from an external device 3 via the wired communication I/F 22B, the CPU 31 performs the second sequential image forming process. In the second sequential image forming process, each time the second image data of a predetermined number of lines is stored into the second buffer 332 provided in the RAM 33, the CPU 31 performs image formation for the stored second image data of the predetermined number of lines. Thereby, it is possible to make shorter a period of time between when the CPU 31 begins to receive the second image data and when the CPU 31 completes image formation for every piece of the second image data. Therefore, it is possible to prevent facsimile communication between the external device 3 and the wired communication I/F 22B from being prolonged. Consequently, it is possible to reduce a cost for the facsimile communication.

Further, when the CPU 31 receives the second image data from an external device 3 via one of the wired communication I/Fs 22A and 22C, and the data size of the second image data is less than a predetermined size, the CPU 31 performs the second sequential image forming process. Accordingly, it is possible to early complete image formation for every piece of the second image data.

When receiving the second image data from another external device 2 via the other wireless communication I/F 21, the CPU 31 determines whether an intensity of radio waves that represents a condition of a wireless connection between the above another external device 2 and the other wireless communication I/F 21 is equal to or more than a predetermined threshold. Then, when the intensity of the radio waves is equal to or more than the threshold, and the data size of the second image data is less than a predetermined size, the CPU 31 performs the second sequential image forming process. In this case, it is possible to early complete image formation for every piece of the second image data. Meanwhile, when the data size of the second image data is equal to or more than the predetermined size, it might take a long period of time to complete receipt of the second image data. Therefore, in such a case, the CPU 31 begins to perform image formation for the first image data after completion of storing all the first image data into the first buffer 331, and performs the second sequential image forming process after completing image formation for every piece of the first image data stored in the first buffer 331. Thereby, it is possible to prevent delay in completing image formation for every piece of the first image data.

Further, when receiving the second image data from the above another external device 2 via the other wireless communication I/F 21, and the intensity of the radio waves that represents the condition of the wireless connection between the above another external device 2 and the other wireless communication I/F 21 is less than the threshold, the CPU 31 begins to perform image formation for one of the first image data and the second image data that has been completely received earlier than the other image data. Then, after completion of the image formation, the CPU 31 begins to perform image formation for the other image data. Therefore, it is possible to efficiently perform image formation for the first image data and the second image data.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<Modifications>

For instance, the CPU 31 may be included in an ASIC ("ASIC" is an abbreviated form of Application Specific Integrated Circuit).

In the aforementioned illustrative embodiment, a single CPU 31 performs each of the processes exemplified therein. Nonetheless, the controller 16 may include a plurality of CPUs. The plurality of CPUs may perform each of the processes in cooperation with each other.

What is claimed is:

1. An image forming apparatus comprising:
a first communication interface configured to perform wireless communication with a first external device;
a second communication interface configured to communicate with a second external device;
an image former configured to form an image on a sheet;
a storage; and
a controller configured to:
  perform a first storing process comprising:
    receiving a first image forming instruction and first image data from the first external device via the first communication interface; and
    storing the received first image data into the storage;
  when a particular value representing a radio wave condition of a wireless connection between the first external device and the first communication interface is less than a predetermined threshold, perform a first image forming process comprising:
    after completion of the first storing process, controlling the image former to perform image formation for the first image data stored in the storage by the first storing process; and
  when the particular value is less than the predetermined threshold, in response to receipt of a second image forming instruction and second image data from the second external device via the second communication interface during execution of the first storing process, perform a second image forming process in advance of performing image formation for the first image data stored in the storage, the second image forming process comprising:
    controlling the image former to perform image formation for the second image data received via the second communication interface.

2. The image forming apparatus according to claim 1, wherein the controller is further configured to:
when the particular value is equal to or more than the predetermined threshold, perform a first sequential image forming process comprising:
  during the execution of the first storing process, each time first image data of a predetermined number of lines is stored into the storage, controlling the image former to perform image formation for the stored first image data of the predetermined number of lines.

3. The image forming apparatus according to claim 1, wherein the second communication interface is configured to perform wired communication with the second external device.

4. The image forming apparatus according to claim 3, wherein the second communication interface comprises:
a facsimile communication interface configured to perform facsimile communication; and
a wired communication interface configured to perform wired communication other than the facsimile communication, and
wherein the controller is further configured to:
perform a second storing process comprising:
  receiving the second image data from the second external device via the second communication interface; and
  storing the received second image data into the storage; and
determine whether the second image data has been received via the facsimile communication interface or via the wired communication interface;

in response to determining that the second image data has been received via the facsimile communication interface, perform a second sequential image forming process in advance of performing image formation for the first image data stored in the storage, the second sequential image forming process comprising:

during execution of the second storing process, each time second image data of a particular number of lines is stored into the storage, controlling the image former to perform image formation for the stored second image data of the particular number of lines.

5. The image forming apparatus according to claim 4, wherein the controller is further configured to:

in response to determining that the second image data has been received via the wired communication interface, determine whether a data size of the second image data is less than a predetermined size;

when determining that the data size of the second image data is less than the predetermined size, perform the second sequential image forming process in advance of performing image formation for the first image data stored in the storage; and when determining that the data size of the second image data is equal to or more than the predetermined size, perform the second sequential image forming process after completion of image formation for the first image data.

6. The image forming apparatus according to claim 1, wherein the second communication interface is configured to perform wireless communication with the second external device, and wherein the controller is further configured to:
perform a second storing process comprising:
receiving the second image data from the second external device via the wireless communication by the second communication interface;
storing the received second image data into the storage; and when a specific value representing a radio wave condition of a wireless connection between the second external device and the second communication interface is equal to or more than a particular threshold, and a data size of the second image data to be received via the second communication interface is less than a particular size, perform a second sequential image forming process in advance of performing image formation for the first image data stored in the storage, the second sequential image forming process comprising:

during execution of the second storing process, each time second image data of a particular number of lines is stored into the storage, controlling the image former to perform image formation for the stored second image data of the particular number of lines; and when the data size of the second image data is equal to or more than the particular size, perform the second sequential image forming process after completion of the image formation for the first image data.

7. The image forming apparatus according to claim 6, wherein the controller is further configured to:

when the specific value is less than the particular threshold, and the first storing process is completed earlier than the second storing process, perform a completion image forming process after completion of image formation for the first image data, the completion image forming process comprising:

after completion of the second storing process, controlling the image former to perform image formation for the second image data stored in the storage by the second storing process; and when the specific value is less than the particular threshold, and the second storing process is completed earlier than the first storing process, control the image former to perform image formation for the second image data stored in the storage by the second storing process, in advance of performing image formation for the first image data stored in the storage.

8. The image forming apparatus according to claim 1, wherein the controller comprises:

a processor; and
a memory storing processor-executable instructions configured to, when executed by the processor, cause the processor to:
perform the first storing process;
when the particular value is less than the predetermined threshold, perform the first image forming process; and
when the particular value is less than the predetermined threshold, in response to receipt of the second image forming instruction and the second image data from the second external device via the second communication interface during the execution of the first storing process, perform the second image forming process in advance of performing image formation for the first image data stored in the storage.

9. A method implementable on a processor coupled with a first communication interface, a second communication interface, an image former, and a storage, the method comprising:

performing a first storing process comprising:
receiving a first image forming instruction and first image data from a first external device via wireless communication by the first communication interface; and
storing the received first image data into the storage;

when a particular value representing a radio wave condition of a wireless connection between the first external device and the first communication interface is less than a predetermined threshold, performing a first image forming process comprising:

after completion of the first storing process, controlling the image former to perform image formation for the first image data stored in the storage by the first storing process; and when the particular value is less than the predetermined threshold, in response to receipt of a second image forming instruction and second image data from a second external device via the second communication interface during execution of the first storing process, performing a second image forming process in advance of performing image formation for the first image data stored in the storage, the second image forming process comprising:

controlling the image former to perform image formation for the second image data received via the second communication interface.

10. A non-transitory computer-readable medium storing computer-readable instructions that are executable by a processor coupled with a first communication interface, a second communication interface, an image former, and a storage, the instructions being configured to, when executed by the processor, cause the processor to:
perform a first storing process comprising:
receiving a first image forming instruction and first image data from a first external device via wireless communication by the first communication interface; and
storing the received first image data into the storage;
when a particular value representing a radio wave condition of a wireless connection between the first external device and the first communication interface is less than a predetermined threshold, perform a first image forming process comprising:
after completion of the first storing process, controlling the image former to perform image formation for the first image data stored in the storage by the first storing process; and
when the particular value is less than the predetermined threshold, in response to receipt of a second image forming instruction and second image data from a second external device via the second communication interface during execution of the first storing process, perform a second image forming process in advance of performing image formation for the first image data stored in the storage, the second image forming process comprising:
controlling the image former to perform image formation for the second image data received via the second communication interface.

11. The non-transitory computer-readable medium according to claim 10,
wherein the instructions are is further configured to, when executed by the processor, cause the processor to:
when the particular value is equal to or more than the predetermined threshold, perform a first sequential image forming process comprising:
during the execution of the first storing process, each time first image data of a predetermined number of lines is stored into the storage, controlling the image former to perform image formation for the stored first image data of the predetermined number of lines.

12. The non-transitory computer-readable medium according to claim 10,
wherein the second communication interface is configured to perform wired communication with the second external device.

13. The non-transitory computer-readable medium according to claim 12,
wherein the second communication interface comprises:
a facsimile communication interface configured to perform facsimile communication; and
a wired communication interface configured to perform wired communication other than the facsimile communication, and
wherein the instructions are further configured to, when executed by the processor, cause the processor to:
perform a second storing process comprising:
receiving the second image data from the second external device via the second communication interface; and
storing the received second image data into the storage; and
determine whether the second image data has been received via the facsimile communication interface or via the wired communication interface;
in response to determining that the second image data has been received via the facsimile communication interface, perform a second sequential image forming process in advance of performing image formation for the first image data stored in the storage, the second sequential image forming process comprising:
during execution of the second storing process, each time second image data of a particular number of lines is stored into the storage, controlling the image former to perform image formation for the stored second image data of the particular number of lines.

14. The non-transitory computer-readable medium according to claim 13,
wherein the instructions are further configured to, when executed by the processor, cause the processor to:
in response to determining that the second image data has been received via the wired communication interface, determine whether a data size of the second image data is less than a predetermined size;
when determining that the data size of the second image data is less than the predetermined size, perform the second sequential image forming process in advance of performing image formation for the first image data stored in the storage; and
when determining that the data size of the second image data is equal to or more than the predetermined size, perform the second sequential image forming process after completion of image formation for the first image data.

15. The non-transitory computer-readable medium according to claim 10,
wherein the second communication interface is configured to perform wireless communication with the second external device, and
wherein the instructions are further configured to, when executed by the processor, cause the processor to:
perform a second storing process comprising:
receiving the second image data from the second external device via the wireless communication by the second communication interface;
storing the received second image data into the storage; and
when a specific value representing a radio wave condition of a wireless connection between the second external device and the second communication interface is equal to or more than a particular threshold, and a data size of the second image data to be received via the second communication interface is less than a particular size, perform a second sequential image forming process in advance of performing image formation for the first image data stored in the storage, the second sequential image forming process comprising:
during execution of the second storing process, each time second image data of a particular number of lines is stored into the storage, controlling the image former to perform image formation for the stored second image data of the particular number of lines; and
when the data size of the second image data is equal to or more than the particular size, perform the second sequential image forming process after completion of image formation for the first image data.

16. The non-transitory computer-readable medium according to claim 15, wherein the instructions are further configured to, when executed by the processor, cause the processor to:

when the specific value is less than the particular threshold, and the first storing process is completed earlier than the second storing process, perform a completion image forming process after completion of image formation for the first image data, the completion image forming process comprising:
after completion of the second storing process, controlling the image former to perform image formation for the second image data stored in the storage by the second storing process; and when the specific value is less than the particular threshold, and the second storing process is completed earlier than the first storing process, control the image former to perform image formation for the second image data stored in the storage by the second storing process, in advance of performing image formation for the first image data stored in the storage.

* * * * *

UNITED STATES PATENT AND TRADEMARK OFFICE
CERTIFICATE OF CORRECTION

PATENT NO. : 10,001,957 B2  
APPLICATION NO. : 15/470985  
DATED : June 19, 2018  
INVENTOR(S) : Mineyuki Ota Page 1 of 1

It is certified that error appears in the above-identified patent and that said Letters Patent is hereby corrected as shown below:

In the Claims

Column 13, Claim 6, Line 61 should read:
of image formation for the first image data.

Signed and Sealed this
Thirteenth Day of November, 2018

Andrei Iancu
*Director of the United States Patent and Trademark Office*